United States Patent [19]

Mathias

[11] Patent Number: 4,606,438
[45] Date of Patent: Aug. 19, 1986

[54] SLIDING CALIPER DISK BRAKE

[75] Inventor: Christopher N. Mathias, Henley-in-Arden, Great Britain

[73] Assignee: Lucas Industries Public Limited Company, Birmingham, England

[21] Appl. No.: 562,066

[22] Filed: Dec. 16, 1983

[30] Foreign Application Priority Data

Dec. 24, 1982 [GB] United Kingdom ............... 8236747

[51] Int. Cl.[4] ............................................. F16D 65/02
[52] U.S. Cl. ............................... 188/73.32; 188/73.35; 188/73.39; 188/250 B
[58] Field of Search ............... 188/73.44, 73.43, 73.45, 188/71.1, 242, 244, 245, 247, 248, 250 B, 255, 258, 73.1, 73.2, 73.31, 73.32, 73.33, 73.34, 73.35, 73.36, 73.37, 73.38, 73.39, 73.47, 345

[56] References Cited

U.S. PATENT DOCUMENTS

| 3,042,152 | 7/1962 | Butler | 188/73.32 |
| 3,390,744 | 7/1968 | Fawick | 188/250 B X |
| 3,486,589 | 12/1969 | Hillegass | 188/244 X |
| 3,767,017 | 10/1973 | Maurice | 188/345 X |
| 3,930,564 | 1/1976 | Kobayashi et al. | 188/73.32 X |
| 3,958,667 | 5/1976 | deGennes | 188/73.43 |
| 4,121,699 | 10/1978 | Tsuruta et al. | 188/73.1 X |
| 4,265,342 | 5/1981 | Karasadani | 188/73.39 |
| 4,465,164 | 8/1984 | Anderson | 188/73.44 |

FOREIGN PATENT DOCUMENTS

| 1555699 | 5/1969 | Fed. Rep. of Germany | 188/73.32 |
| 1548220 | 7/1979 | United Kingdom | 188/73.38 |

Primary Examiner—Bruce H. Stoner, Jr.
Assistant Examiner—Michael P. Gilday
Attorney, Agent, or Firm—Holman & Stern

[57] ABSTRACT

A sliding caliper disc brake has a fixed carrier carrying directly and indirectly actuated pads. A caliper is slidably mounted on the carrier and carries brake actuators. The backing plates of the pads are provided with ribs for engagement in corresponding grooves in the carrier and arranged to provide additional support for the caliper, in use, in the vertical direction.

5 Claims, 3 Drawing Figures

SLIDING CALIPER DISK BRAKE

This invention relates to a sliding caliper disc brake, primarily for use in motor vehicles.

The invention is particularly concerned with a disc brake having a carrier mountable on a vehicle in a fixed position straddling a rotatable brake disc carried by a member to be braked, a pair of brake pads mounted on the carrier respectively at either side of the disc, and a caliper mounted on the carrier by way of at least one pin for sliding movement relative to the carrier in a direction parallel to the axis of rotation of the disc and also straddling the disc, the caliper including actuating means for directly urging one of said pads into braking engagement with the disc, thereby indirectly actuating the other of said pads by causing the caliper to slide relative to the carrier and urge said other pad into braking engagement with the disc.

In disc brakes of this general type, a part of the caliper which straddles the disc is often unsupported and therefore subject to vibrations occurring, in normal use, in a vehicle to which the brake is fitted. This can be acceptable in small brakes designed for use in cars for example, but with heavier duty brakes used in commercial vehicles, the weight of the unsupported caliper part is such that the aforesaid vibrations in use can lead to bending of the support pin which hinders proper sliding of the caliper, or may even lead to pin breakage in extreme cases.

An object of the invention is to provide a sliding caliper disc brake in which this difficulty is minimised or avoided.

According to the present invention, in a sliding caliper disc brake of the aforesaid general type, the indirectly actuated pad and caliper are provided with interengaging formations of which the mating surfaces lie in planes perpendicular to the longitudinal axes of the pins and are arranged to provide additional support for the caliper.

It is desirable with heavy duty brakes to be able to withdraw the pads radially from the caliper in order to avoid displacing the relatively heavy caliper relative to the carrier. To this end, the caliper may be provided with an access opening in an outer wall thereof and said surfaces may then advantageously be arranged to permit radial withdrawal of the pad from the carrier through said caliper opening without effecting displacement of the caliper relative to the carrier.

In one convenient practical arrangement, the interengaging formations are in the form of a rib on the backing plate of the indirectly actuated pad and a complementary groove in the caliper. The rib is conveniently disposed generally centrally of the pad in the widthwise direction thereof.

The invention will now be described, by way of example, with reference to the accompanying drawings in which.

Figure 1:
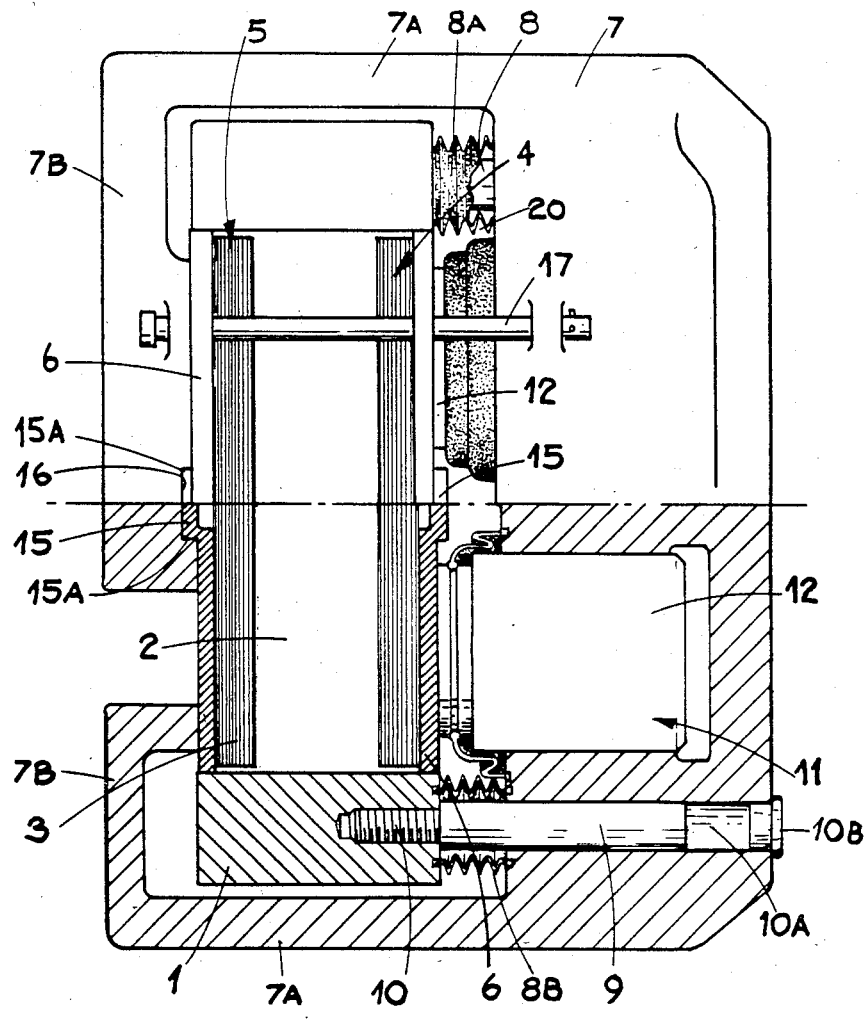
FIG. 1 is a plan view, partly in cross-section, of one form of the sliding caliper disc brake of the invention.

Referring to FIG. 1 of the drawings, the sliding caliper disc brake illustrated therein includes a carrier 1 which is provided with means, such as lugs (not shown) through which bolts may be passed in order to secure the carrier in position on a fixed part of a vehicle adjacent to a brake disc 2. The carrier includes a bridge portion which is not visible in the drawing but which straddles the periphery of the disc and is connected to side portions in which are formed recesses containing brake pads 3 and 4 disposed respectively at either side of the disc. Each pad includes a layer 5 of friction material which is bonded or otherwise secured to a metal backing plate 6. Braking drag is transferred from the pads to the carrier in conventional manner.

The disc brake also includes a caliper 7 slideably mounted on the carrier for movement in a direction parallel to the rotary axis of the disc by means of a pair of pins 8 and 9, threaded ends 10 of which are received in threaded holes of the carrier, whilst the greater part of the remainder of the pin lengths are received in through bores 10A of the caliper and provide support surfaces along which the caliper may slide as aforesaid. The open ends of the bores are closed by plugs 10B (only one bore 10A and plug 10B being shown in this drawing). It would alternatively be possible to secure the pin ends within the caliper and insert the supporting portions of the pins within corresponding bores of the carrier. Sealing is effected between the sliding caliper 7 and the fixed carrier 1 by means of respective convoluted boots 8A, 9A, surrounding the exposed portions of the pins.

In the embodiment described the portion of the caliper within which the pins 8 and 9 are slideably received contains a pair of hydraulic actuators, indicated generally at 11, the pistons 12 of which bear directly on the backing plate 6 of the adjacent pad and will urge this pad directly into braking engagement with the disc 2 upon introduction of hydraulic fluid into the actuators. The caliper has arms 7A embracing the disc periphery and connected to portions 7B of the caliper which extend parallel to the plane of the disc and abut the backing plate 6 of the other brake pad. Actuation of the pad 4 produces a reaction causing the caliper to slide on the pins 8 and 9 so that the pad 5 is applied against the disc by movement of the adjacent caliper portion 7B.

Figure 2:
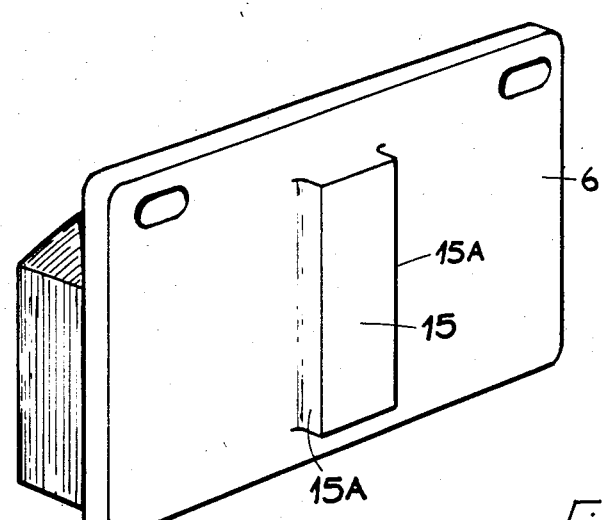
FIG. 2 is a perspective view of one form of brake pad for use in the disc brake of FIG. 1.

The arms 7A project by a considerable distance beyond the bearing surfaces of the pins 8 and 9, so that these arms and the portions 7B are relatively unsupported and subject to the effects of vibration arising on the brake during normal use. In a heavy duty brake for commercial use, the unsupported part of the brake can be of considerable weight and the effect of the aforesaid vibration can be sufficient to deform the pins 8 and 9, thereby preventing proper sliding of the caliper thereon, or to cause pin breakage in extreme cases. In order to provide additional support for the overhanging parts of the caliper, the backing plate 6 of the indirectly actuated pad has a rib 15 formed thereon (FIG. 2) extending perpendicularly to the longitudinal axis of the pins 8 and 9. The rib 15 is received within a complementary recess 16 formed in an adjacent surface of the caliper portion 7B so that the sides 15A of the rib closely engage adjacent opposed surfaces of the recess 16.

Figure 3:
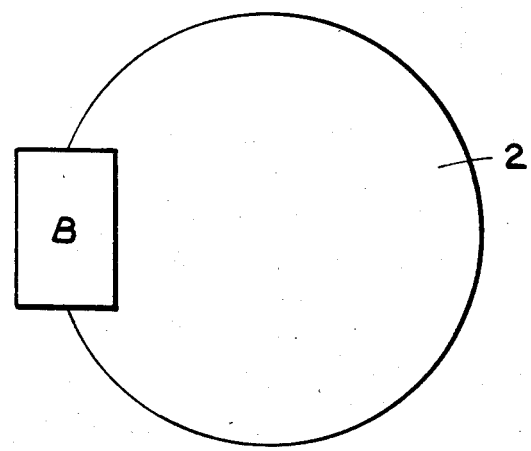
FIG. 3 illustrates diagrammatically one possible arrangement of the disc brake, in use, in relation to a brake disc.

This arrangement is adopted when the brake B is disposed at a location on the periphery of the disc away from the uppermost point of the disc periphery, as illustrated in FIG. 3. With this disposition, the pins 8 and 9 are disposed in a generally vertical plane and vertical vibrations sustained by the unsupported caliper portions are reacted by one or both of the rib surfaces 15A. This effectively minimises risk of deformation or breakage of the pins 8 and 9 and it will be seen that the ribs also permit sliding of the pad 5 in a direction radially of the disc so that the pad may be removed through an adjacent opening 20 of the caliper without the necessity of displacing the caliper relative to the carrier. Such pad removal would be effected by first removing conventional retaining pins 17 extending through the caliper and across said opening.

It is possible to provide a plurality of ribs and corresponding grooves for each pad, although a single rib will suffice in many cases.

It will be seen that the invention provides a simple cheap and convenient means of resisting vibrational forces arising on a relatively unsupported part of the caliper, it being relatively easy to form the ribs 15 by part shearing of the pad backing plate 6. It will be seen that the pads can conveniently be non-handed, the rib 15 on the directly actuated pad being conveniently housed between the actuators 12.

I claim:

1. A sliding caliper disc brake comprising a carrier mountable on a vehicle in a fixed position straddling a rotatable brake disc carried by a member to be braked, a pair of brake pads mounted on the carrier respectively at either side of the disc, and a caliper slidably mounted on the carrier for movement relative to the carrier in a direction parallel to the axis of rotation of the disk and having an access opening in a wall thereof, the caliper including a first portion supported for sliding movement and containing actuating means for directly actuating one of said pads by urging it into braking engagement with the disc, and a second portion projecting outwardly of said first portion and straddling the disc to cause indirect actuation of the other of said pads upon sliding movement of the caliper as a result of said direct actuation of said one pad, and the brake including means for minimizing vibrations in said second portion of the caliper comprising interengaging formations on the caliper and the indirectly actuated pad having mating surfaces which lie in plates perpendicular to the direction of said sliding caliper movement, said formations being configured and disposed for additional support of said outwardly projecting caliper part on the carrier via said indirectly actuated pad and for radial sliding of the indirectly actuated pad on the outwardly projecting caliper part permitting withdrawal of the indirectly actuated pad from the carrier through said caliper opening without effecting displacement of the caliper relative to the carrier.

2. A brake according to claim 1 wherein the interengaging formations are in the form of a rib on the indirectly actuated pad and a complementary groove in the caliper.

3. A brake according to claim 2 wherein the rib is disposed generally centrally of the pad.

4. A brake according to claim 1 wherein each pad includes a backing plate carrying a lining of friction material and the formation on the indirectly actuated pad is on the backing plate thereof.

5. A brake according to claim 1 wherein the formations are of generally rectangular cross-section.

* * * * *